United States Patent
Numata

(10) Patent No.: US 11,106,114 B2
(45) Date of Patent: Aug. 31, 2021

(54) IMAGING APPARATUS AND MONITORING SYSTEM

(71) Applicant: CANON KABUSHIKI KAISHA, Tokyo (JP)

(72) Inventor: Aihiko Numata, Inagi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/519,265

(22) Filed: Jul. 23, 2019

(65) Prior Publication Data

US 2020/0033701 A1 Jan. 30, 2020

(30) Foreign Application Priority Data

Jul. 30, 2018 (JP) .............................. JP2018-142871

(51) Int. Cl.
*G03B 15/03* (2021.01)

(52) U.S. Cl.
CPC .................................... *G03B 15/03* (2013.01)

(58) Field of Classification Search
CPC ............ G03B 15/05; G03B 2215/0528; G03B 2215/051; G03B 2215/0503; H04N 5/2256
USPC ......................................................... 396/175
See application file for complete search history.

(56) References Cited

U.S. PATENT DOCUMENTS

| | | | | |
|---|---|---|---|---|
| 6,072,529 A * | 6/2000 | Mutze | .................... | H04N 5/232 348/351 |
| 6,985,177 B2 * | 1/2006 | Takahashi | .......... | H04N 5/23287 348/208.99 |
| 7,634,184 B2 * | 12/2009 | Woehler | .................... | G03B 5/08 348/294 |
| 9,584,730 B2 * | 2/2017 | Costigan | .............. | H04N 5/2252 |
| 10,142,546 B2 * | 11/2018 | Ito | .............................. | G03B 5/00 |
| 2017/0192247 A1 * | 7/2017 | Okuda | ................ | H04N 5/23209 |
| 2017/0272658 A1 * | 9/2017 | Ito | .......................... | G03B 13/36 |
| 2020/0137293 A1 * | 4/2020 | Numata | ........... | H04N 5/232123 |
| 2020/0186710 A1 * | 6/2020 | Sheikh | ............... | H04N 5/23299 |

FOREIGN PATENT DOCUMENTS

| | | |
|---|---|---|
| CN | 105607403 A | 5/2016 |
| JP | H11281879 A | 10/1999 |
| JP | 2011043944 A | 3/2011 |
| JP | 2013041282 A | 2/2013 |
| JP | 2017161487 A | 9/2017 |
| KR | 10-2017-0012613 A | 2/2017 |

OTHER PUBLICATIONS

Extended European Search Report issued by the European Patent Office dated Dec. 13, 2019 in corresponding EP Patent Application No. 19188812.2.
Notification of the First Office Action issued by the China National Intellectual Property Administration dated Feb. 18, 2021 in corresponding CN Patent Application No. 201910697018.4, with English translation.

* cited by examiner

*Primary Examiner* — Clayton E. LaBalle
*Assistant Examiner* — Warren K Fenwick
(74) *Attorney, Agent, or Firm* — Carter, DeLuca & Farrell LLP

(57) ABSTRACT

An imaging apparatus includes an image sensor, an angle controller configured to change an angle between a plane orthogonal to an optical axis of an imaging optical system and an imaging plane of the image sensor, an illuminator; and an illumination controller configured to change an optical axis direction of the illuminator based on the angle.

17 Claims, 12 Drawing Sheets

IMAGING APPARATUS AND MONITORING
SYSTEM

BACKGROUND OF THE INVENTION

Field of the Invention

The present invention relates to an imaging apparatus having an illuminator.

Description of the Related Art

For example, Japanese Patent Laid-Open No. ("JP") 11-281879 discloses an imaging apparatus that can provide so-called tilt imaging that inclines an optical axis of a camera lens to an image sensor, when an object plane inclines to a principal plane of the lens so as to maintain deep a depth of field even if the camera lens uses a telephoto lens with a bright F-number. For example, JP 2013-41282 discloses a network camera including an illuminator, such as an infrared LED, in order to obtain a clear object image even at a low illuminance at night or the like.

However, the following problem occurs when the illuminator disclosed in JP 2013-41282 is applied to the imaging apparatus that provides the tilt imaging as disclosed in JP 11-281879 in order to improve the visibility at the low illuminance. In general, in the tilt imaging, the object plane inclines to the principal plane of the camera lens. In other words, the distance from the imaging apparatus to the object differs within an angle of view of the image sensor. Thus, as in the network camera disclosed in JP 2013-41282, when the optical axis of the lens and the optical axis of the illuminator coincide with each other, the object has an uneven luminance distribution within an angle of view and the captured image quality is degraded. In particular, a large uneven luminance distribution is likely to cause clipped whites and crashed shadows in the captured image.

SUMMARY OF THE INVENTION

The present invention provides an imaging apparatus and a monitoring system, each of which can improve the captured image quality by reducing an uneven luminance distribution of an object in tilt imaging using an illuminator.

An imaging apparatus according to one aspect of the present invention includes an image sensor, an angle controller configured to change an angle between a plane orthogonal to an optical axis of an imaging optical system and an imaging plane of the image sensor, an illuminator; and an illumination controller configured to change an optical axis direction of the illuminator based on the angle. A monitoring system including the above imaging apparatus also constitutes another aspect of the present invention.

Further features of the present invention will become apparent from the following description of exemplary embodiments with reference to the attached drawings.

DESCRIPTION OF THE EMBODIMENTS

Figure 1:
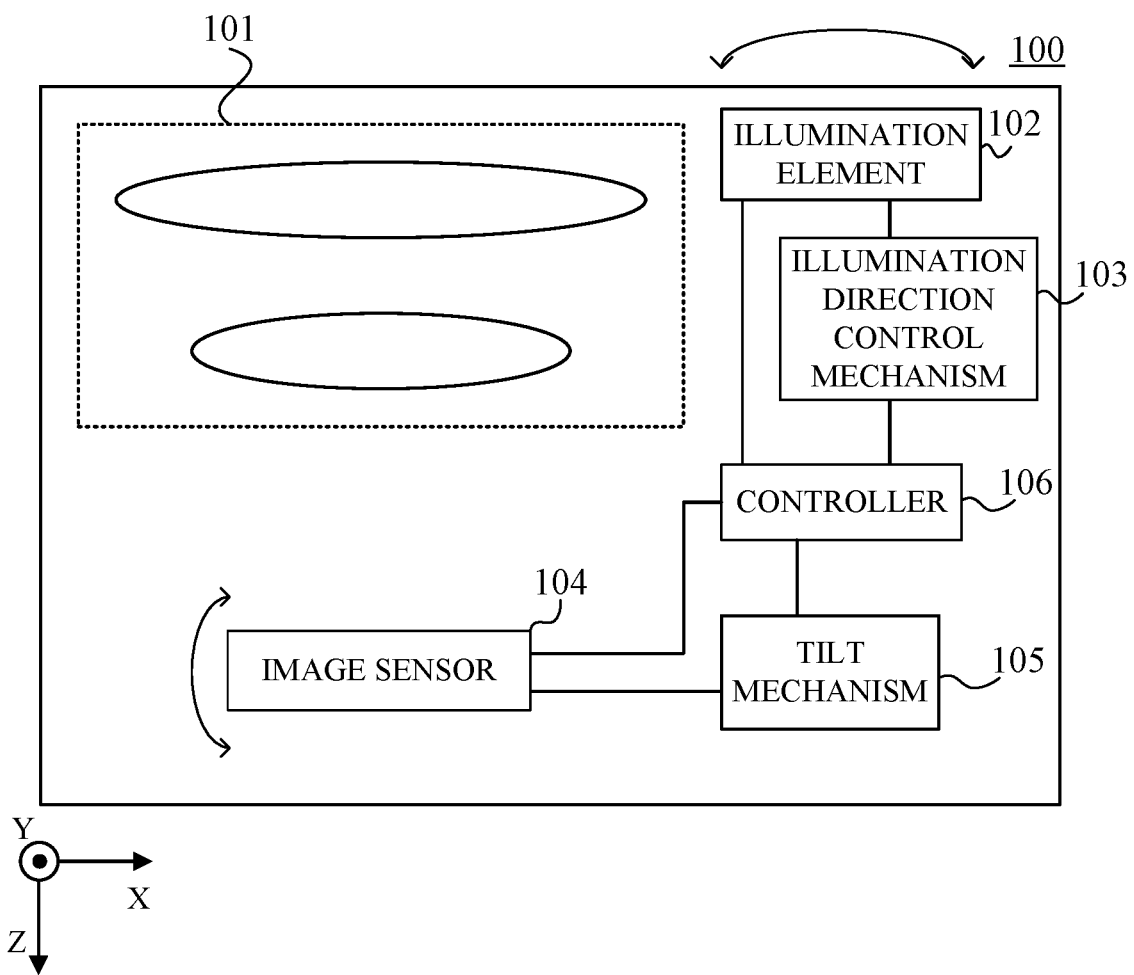
FIG. 1 is a block diagram of an imaging apparatus according to a first embodiment.

Referring now to the accompanying drawings, a description will be given of embodiments according to the present invention. In respective figures, corresponding elements will be designated by the same reference numerals, and a duplicate description thereof will be omitted.

First Embodiment

Referring now to FIG. 1, a description will be given of an imaging apparatus according to a first embodiment of the present invention. FIG. 1 is a block diagram of an imaging apparatus 100 according to this embodiment. The imaging apparatus 100 includes an imaging optical system (image capturing optical system) 101, an illumination element (illuminator) 102, an illumination direction control mechanism (illumination controller) 103, an image sensor (solid-state image pickup element) 104, and a tilt mechanism (angle controller) 105, and a controller 106. The controller 106 controls each component in the image apparatus 100. The imaging optical system 101 may be of a removable interchangeable lens type.

The image sensor 104 is a CMOS sensor or a CCD sensor, and photoelectrically converts an object image (optical image) formed through the imaging optical system 101. The illumination element 102 emits light having a wavelength to which the image sensor 104 is sensitive. For example, when the image sensor 104 is made of silicon (Si), the illumination element 102 may use an LED made of a compound semiconductor, such as AlGaAs and InGaN. The controller 106 controls turning on and off of the illumination element 102 and the light intensity emitted from the illumination element 102. The illumination direction control mechanism 103 controls the orientation of the illumination element 102 by rotating the illumination element 102. The illumination direction control mechanism 103 includes a motor and a gear. The controller 106 can rotate the illumination element 102 on the XZ plane by controlling the current flowing through the motor of the illumination direction control mechanism 103. The tilt mechanism 105 can rotate the orientation of the image sensor 104 in the XZ plane.

Figure 2:
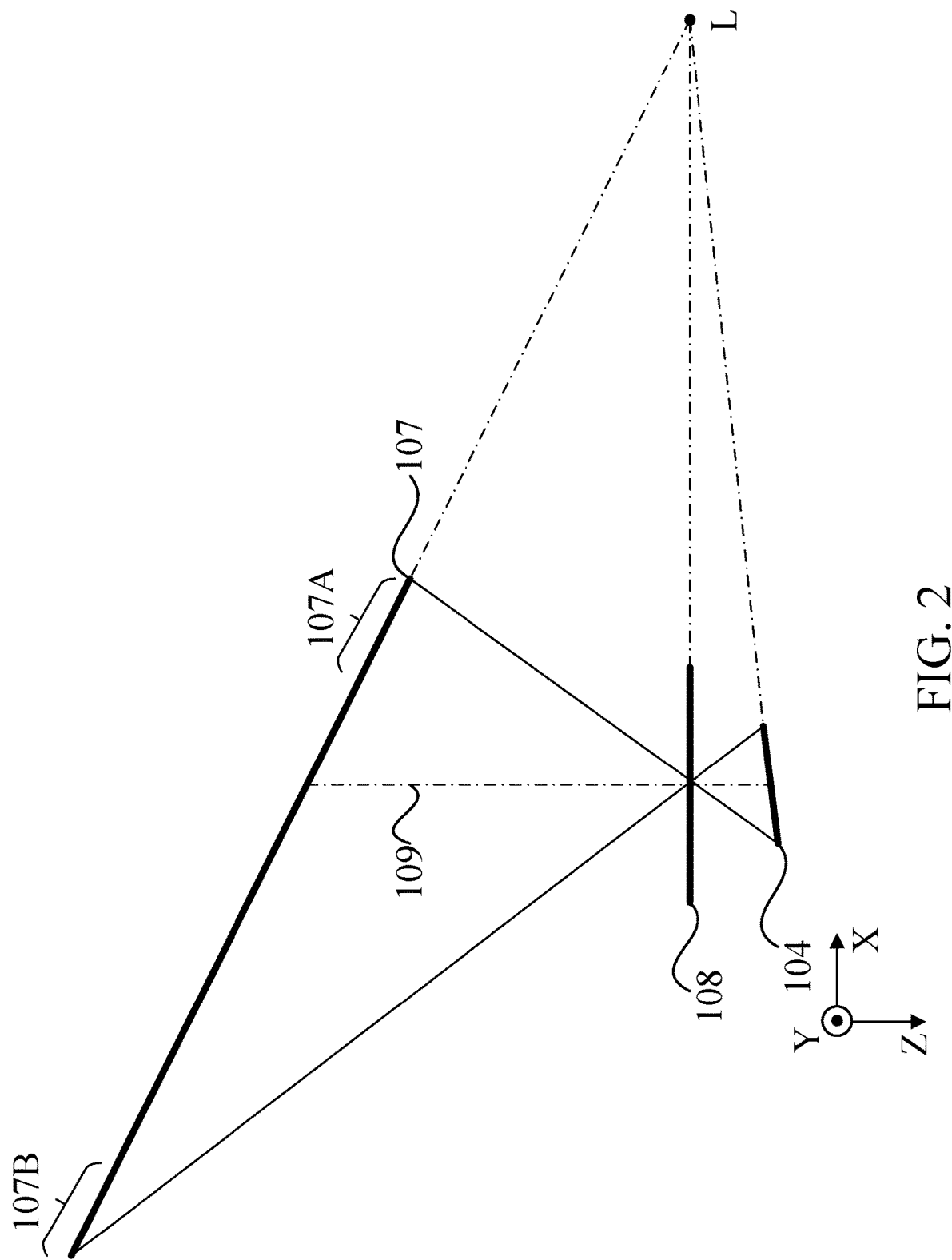
FIG. 2 is an explanatory view of a focus plane in tilt imaging according to the first embodiment.

Referring now to FIG. 2, a focus plane 107 in the tilt imaging will be described. FIG. 2 is an explanatory view of the focus plane 107 in the tilt imaging. According to the shine proofing principle, the light incident surface (imaging plane) of the image sensor 104, the principal plane 108 (surface orthogonal to the optical axis 109) of the imaging optical system 101, and the focus plane 107 intersects with a straight line L that extends in the Y axis direction. Thus, the focus plane 107 inclines to the principal plane 108 of the imaging optical system 101 in the XZ plane. In FIG. 2, reference numeral 109 denotes an optical axis of the imaging optical system 101.

Figure 3A:
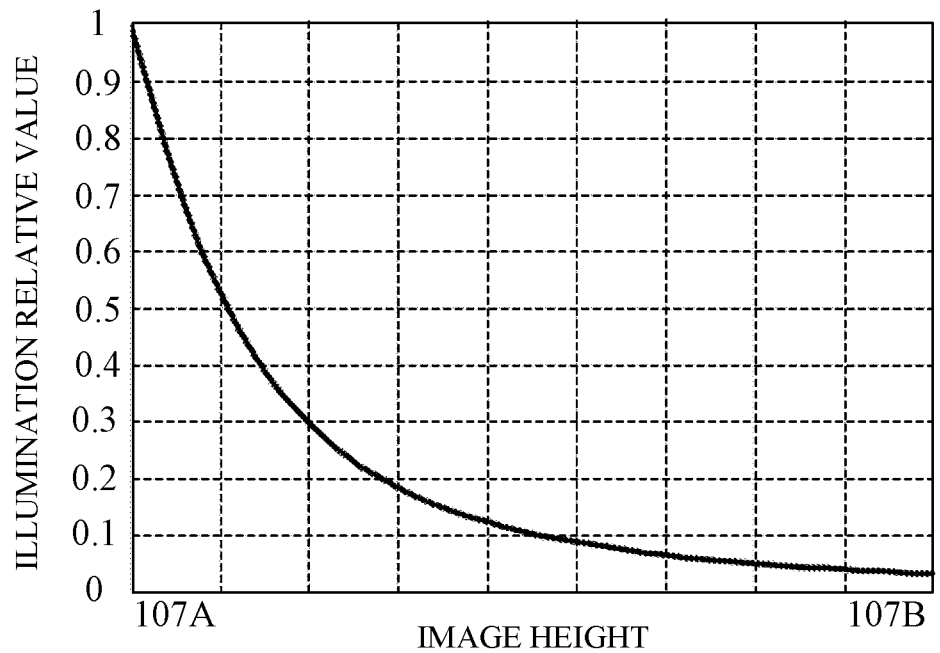
FIGS. 3A and 3B are illumination distribution views of an object plane.

Next, assume that the optical axis 110 of the illumination element 102 accords with the optical axis 109 of the imaging optical system 101 in the imaging apparatus 100 in which the focus plane 107 inclines to the principal plane 108 of the imaging optical system 101, as disclosed in the prior art, such as JP 2013-41282. FIG. 3A is an illuminance distribution diagram of the focus plane 107 (object plane) when the optical axis 110 of the illumination element 102 coincides with the optical axis 109 of the imaging optical system 101 in tilt imaging. In FIG. 3A, the abscissa axis denotes the image height, and the ordinate axis denotes the illuminance (illuminance relative value). As illustrated in FIG. 3A, the illuminance largely differs according to the image heights, and a large uneven illuminance occurs at the angle of view. This is because the distance between the illumination element 102 and the focus plane 107 is largely different within the angle of view of the imaging apparatus 100 in tilt imaging. Since the illuminance is high at a position where the distance between the illumination element 102 and the focus plane 107 is close (in an area 107A in FIG. 2), and low at the position where the distance between the illumination element 102 and the focus plane 107 is long (FIG. 2) (in an area 107B), an uneven illuminance occurs. As a result, the uneven illuminance of the image occurs and the visibility reduces.

Figure 3B:
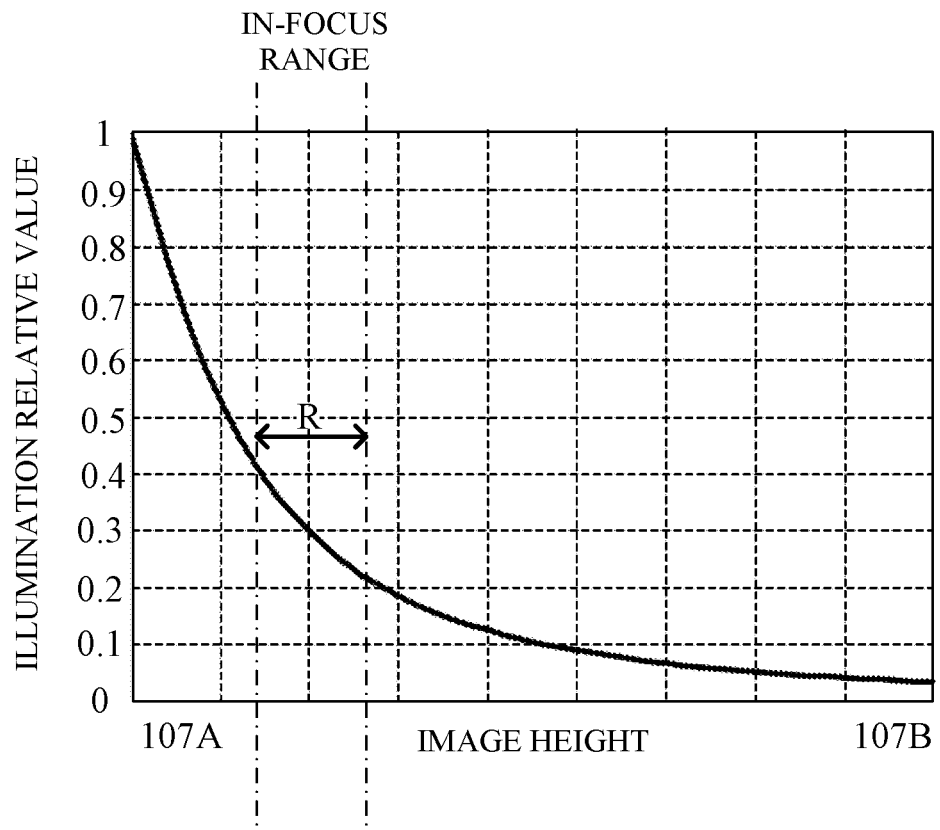

FIG. 3B is, as a comparative example, an illuminance distribution diagram where the tilt imaging is not performed. As illustrated in FIG. 3B, the same uneven illuminance occurs even when the tilt imaging is not performed. However, where the tilt imaging is not performed, an in-focus range R is narrow in which the object is in focus. Thus, the uneven illuminance is small within the in-focus range. In other words, where the tilt imaging is not performed, the visibility reduces due to the uneven illuminance only in the area where the object image is blurred because the object is not in focus.

In general, for an imaging apparatus for an observation, it is a big issue whether the blur degree is beautiful or not even in the area where the object image is blurred. Thus, the visibility decrease caused by the uneven illuminance becomes an issue. However, in the imaging apparatus for a recognition such as monitoring purposes, the result that the object is too blurred to be recognized does not change in an area where the object image is blurred, regardless of the uneven illuminance. Thus, in the area where the object image is blurred, the problematically reduced visibility caused by the uneven illuminance does not frequently occur. Hence, the problematically reduced visibility of the object image caused by the uneven illuminance does not frequently occur when the imaging apparatus for the recognition does not perform the tilt imaging. The present invention suppresses the problematically reduced visibility of the object image in the imaging apparatus for the recognition due to the uneven illuminance in the tilt imaging. Hereinafter, this embodiment will be specifically described.

Figure 4:
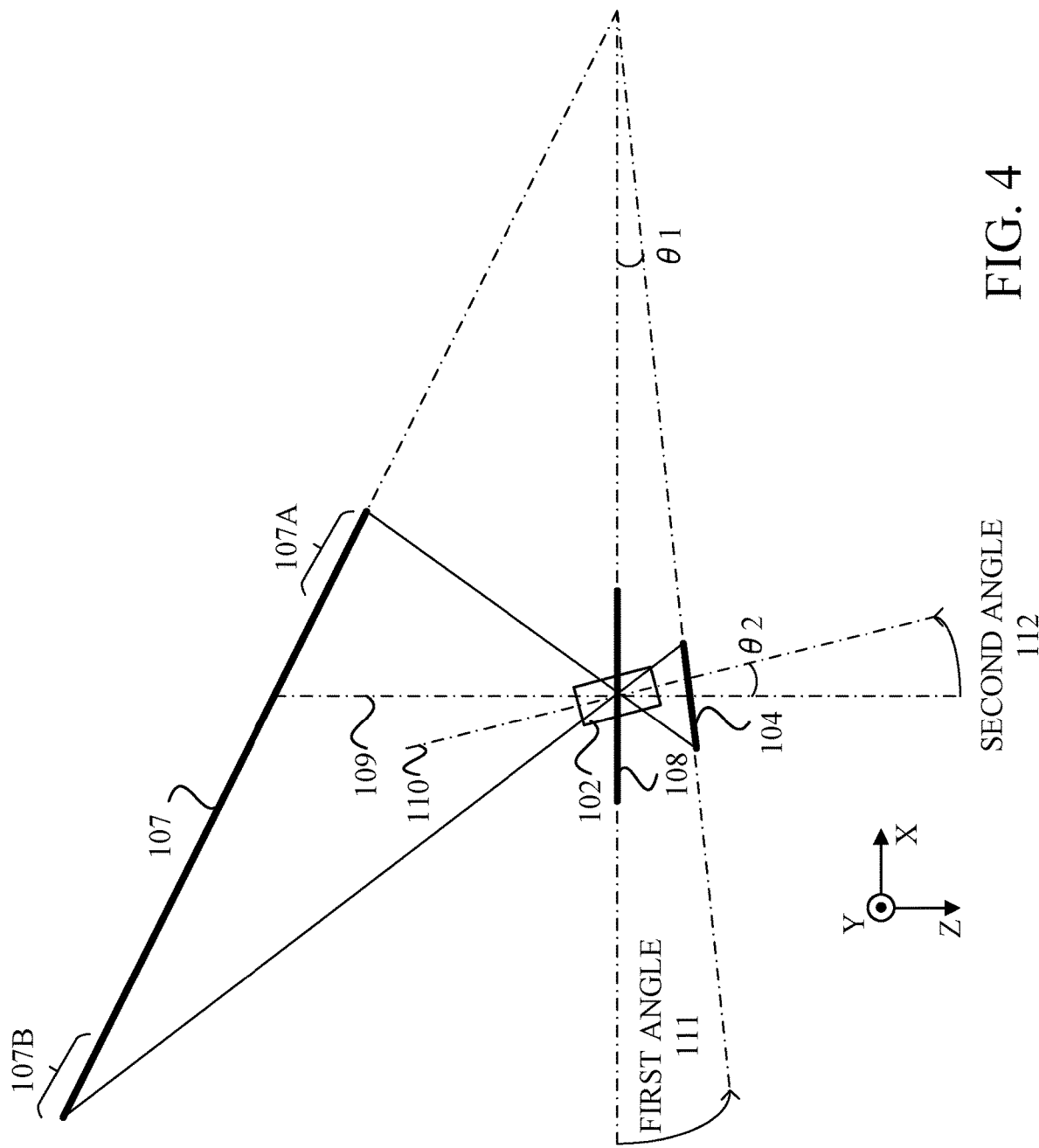
FIG. 4 illuminates a relationship between an image sensor and an illumination element in tilt imaging according to the first embodiment.

Referring now to FIG. 4, a description will be given of a relationship between the image sensor 104 and the illumination element 102 in the tilt imaging using the imaging apparatus 100. FIG. 4 illustrates a relationship between the image sensor 104 and the illumination element 102 in the tilt imaging, or a relationship among the light incident surface (imaging plane) of the image sensor 104, the principal plane 108 of the imaging optical system 101, the focus plane 107, and the optical axis 110 of the illumination element 102. The direction of the optical axis 110 of the illumination element 102 is the center of gravity direction of the light intensity distribution emitted from the illumination element 102.

As illustrated in FIG. 4, the light incident surface of the image sensor 104 rotates counterclockwise with the Y axis as the rotation center and based on the principal plane 108 of the imaging optical system 101. The imaging apparatus 100 according to this embodiment sets the optical axis 110 of the illumination element 102 to the rotation center which is the Y axis and rotates it counterclockwise based on the optical axis 109 of the imaging optical system 101 as the light incident surface of the image sensor 104 rotates. Now assume that an angle (tilt angle) θ1 formed between the principal plane 108 of the imaging optical system 101 and the light incident surface of the image sensor 104 is a first angle 111. In addition, assume that an angle θ2 formed between the optical axis 110 of the illumination element 102 and the optical axis 109 of the imaging optical system 101 is a second angle 112. At this time, a code of the first angle 111 (the rotation direction of the light incident surface of the image sensor 104 based on the principal plane 108 of the imaging optical system 101) and a code of the second angle 112 (the rotation direction of the optical axis 110 of the illumination element 102 based on the optical axis 109 of the imaging optical system 101) coincide with each other. In other words, the rotation direction of the first angle 111 (counterclockwise direction in FIG. 4) and the rotation direction of the second angle 112 (counterclockwise direction) coincide with each other. Hence, the uneven illuminance can be reduced by changing (rotating) the direction of the optical axis 110 of the illumination element 102 in accordance with the tilt direction of the image sensor 104.

Figure 5:
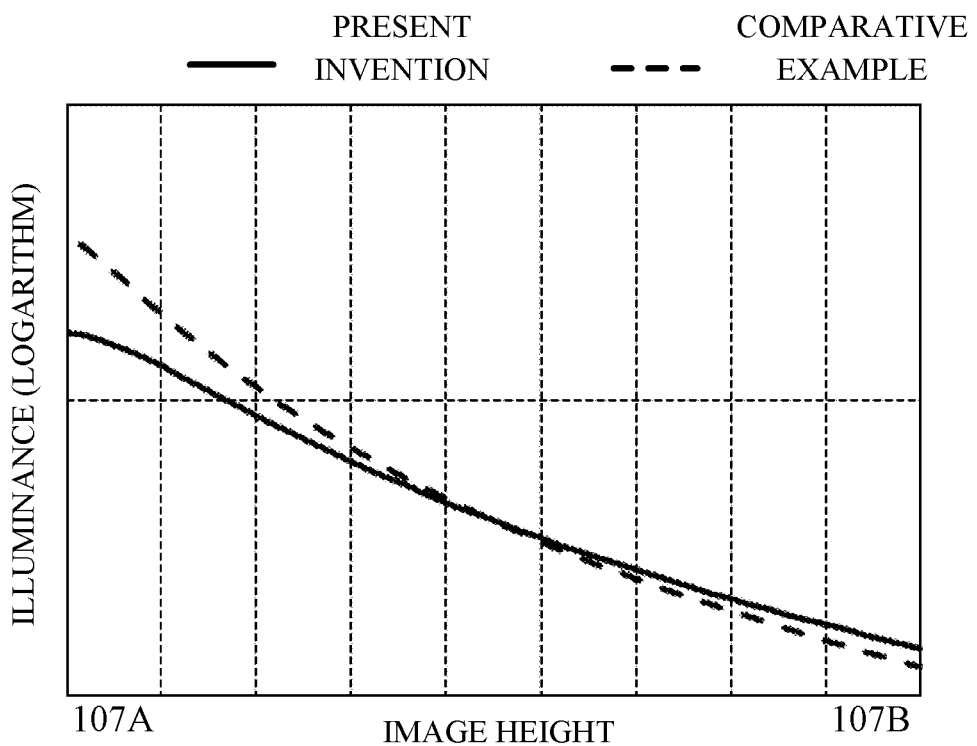
FIG. 5 is an illuminance distribution diagram of the object plane according to the first embodiment.

Referring now to FIG. 5, a description will be given of the illuminance distribution of each of the focus plane 107 (object plane) when the optical axis 110 of the illumination element 102 is rotated relative to the optical axis 109 of the imaging optical system 101 and when the optical axis 110 of the illumination element 102 is not rotated. FIG. 5 is an illuminance distribution diagram of the focus plane 107 (object plane) when the optical axis 110 of the illumination element 102 is rotated relative to the optical axis 109 of the imaging optical system 101 and when the optical axis 110 is not rotated. In FIG. 5, the abscissa axis represents the image height, and the ordinate axis represents the illuminance (logarithm). In FIG. 5, a solid line represents the illuminance distribution when the optical axis 110 of the illumination element 102 is rotated as in this embodiment, and a broken line represents the illuminance distribution when the light axis 110 of the illumination element 102 is not rotated as in a comparative example. As illustrated in FIG. 5, the solid line changes more gently than the broken line. Hence, the uneven illuminance can be reduced by rotating the optical axis 110 of the illumination element 102 relative to the optical axis 109 of the imaging optical system 101. The reason will be described below.

As described above, the uneven illuminance in the tilt imaging is caused by the distance between the illumination element 102 and the focus plane 107 that is largely different within the angle of view of the imaging apparatus 100. Thus, the uneven illuminance when the strong light is irradiated onto the position (area 107B in FIG. 4) in which the distance between the illumination element 102 and the focus plane 107 is long is lower than that when the strong light is irradiated onto the position (area 107A in FIG. 4) in which the distance between the illumination element 102 and the focus plane 107 is short. In general, the illumination element 102 reflects the structure of the LED and has an orientation distribution having a strong directivity in the direction (optical axis direction) perpendicular to the surface of the LED. Hence, the uneven illuminance can be reduced by inclining the optical axis 110 of the illumination element 102 in the direction in which the distance between the illumination element 102 and the focus plane 107 is long. As a result, the captured image quality can be improved, and the recognition accuracy of the object can be improved.

The second angle 112 formed between the optical axis 109 of the imaging optical system 101 and the optical axis 110 of the illumination element 102 may be determined according to the first angle 111 formed between the principal plane 108 of the imaging optical system 101 and the light incident surface (imaging plane) of the image sensor 104 so as to sufficiently reduce the uneven illuminance. The second angle 112 is determined according to the first angle 111 so as to most reduce the uneven illuminance.

Figure 6:
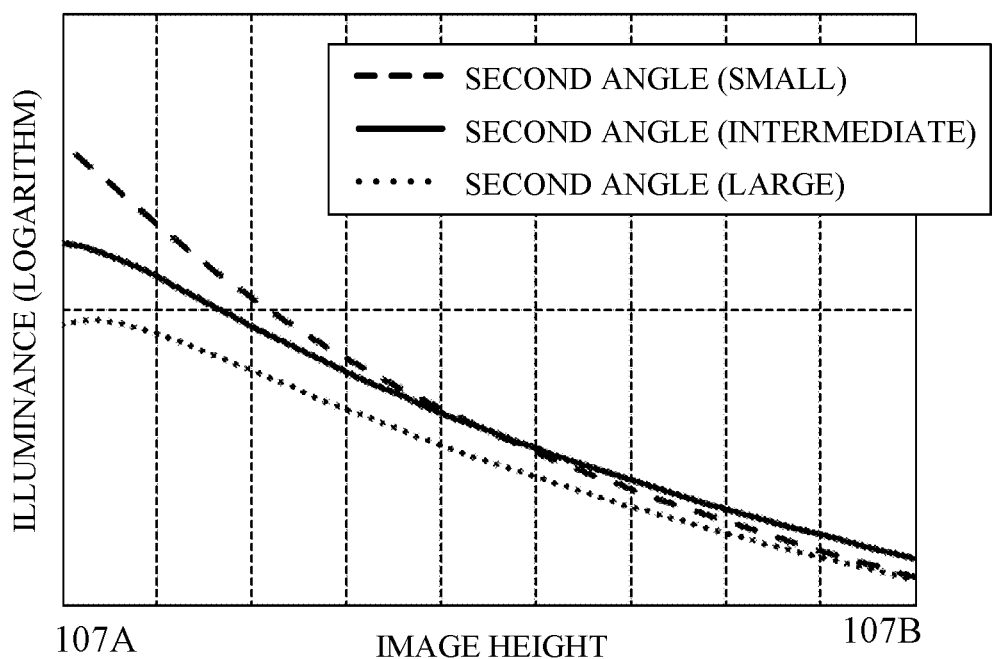
FIG. 6 is an illuminance distribution diagram of the object plane when a second angle in the first embodiment is changed.

Referring now to FIG. 6, a description will be given of the illuminance distribution of the focus plane 107 when the second angle 112 is changed. FIG. 6 is an illuminance distribution diagram of the focus plane 107 when the second angle 112 is changed. In FIG. 6, the abscissa axis represents the image height, and the ordinate axis represents the illuminance (logarithm). In FIG. 6, a broken line represents that the absolute value of the second angle 112 is small, a dotted line represents that an absolute value of the second angle 112 is large, and a solid line represents that an absolute value of the second angle 112 is intermediate between them. As illustrated in FIG. 6, as the absolute value of the second angle 112 is made larger, the uneven illuminance becomes lower. In particular, when the absolute value of the second angle 112 is made equal to or more than a half of the angle of view of the imaging apparatus 100, the uneven illuminance can be sufficiently reduced.

On the other hand, as illustrated by the dotted line in FIG. 6, as the absolute value of the second angle 112 is made excessively large, the uneven illuminance decreases, but the average illuminance within the angle of view of the imaging apparatus 100 decreases. This is because if the absolute value of the second angle 112 is made excessively large, a light amount emitted from the illumination element 102 to the outside of the angle of view of the imaging apparatus 100 increases. In particular, when the absolute value of the second angle 112 is made equal to or less than the angle of view of the imaging apparatus 100, a light amount emitted to the outside the angle of view of the imaging apparatus 100 is reduced.

Figure 7A:
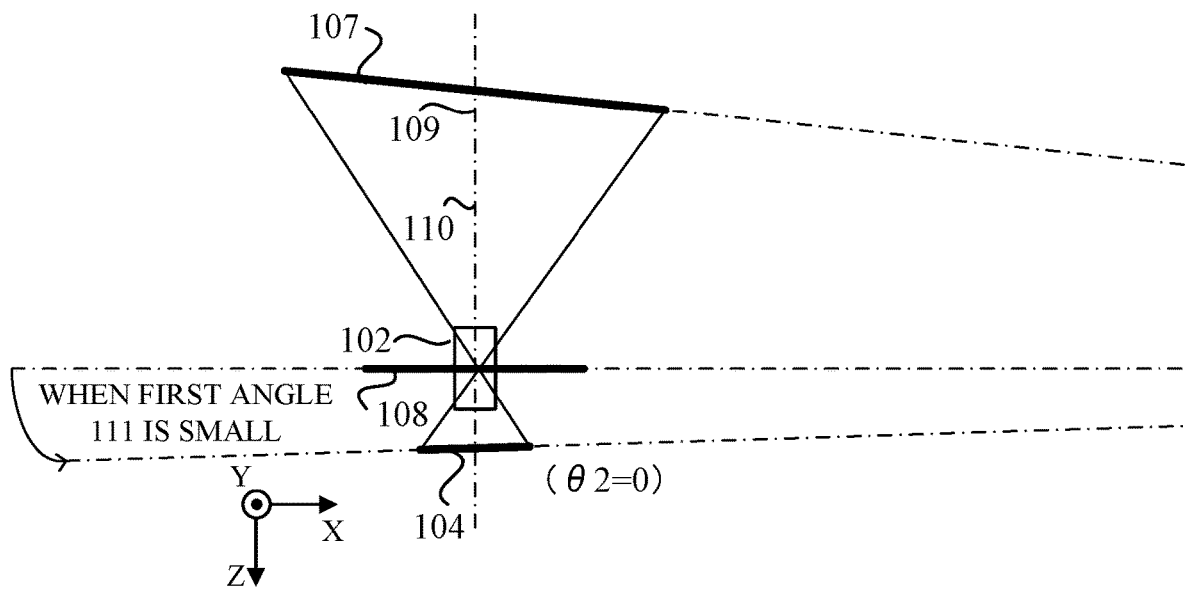
FIGS. 7A and 7B are explanatory diagrams of the object plane according to the first embodiment.
Figure 7B:
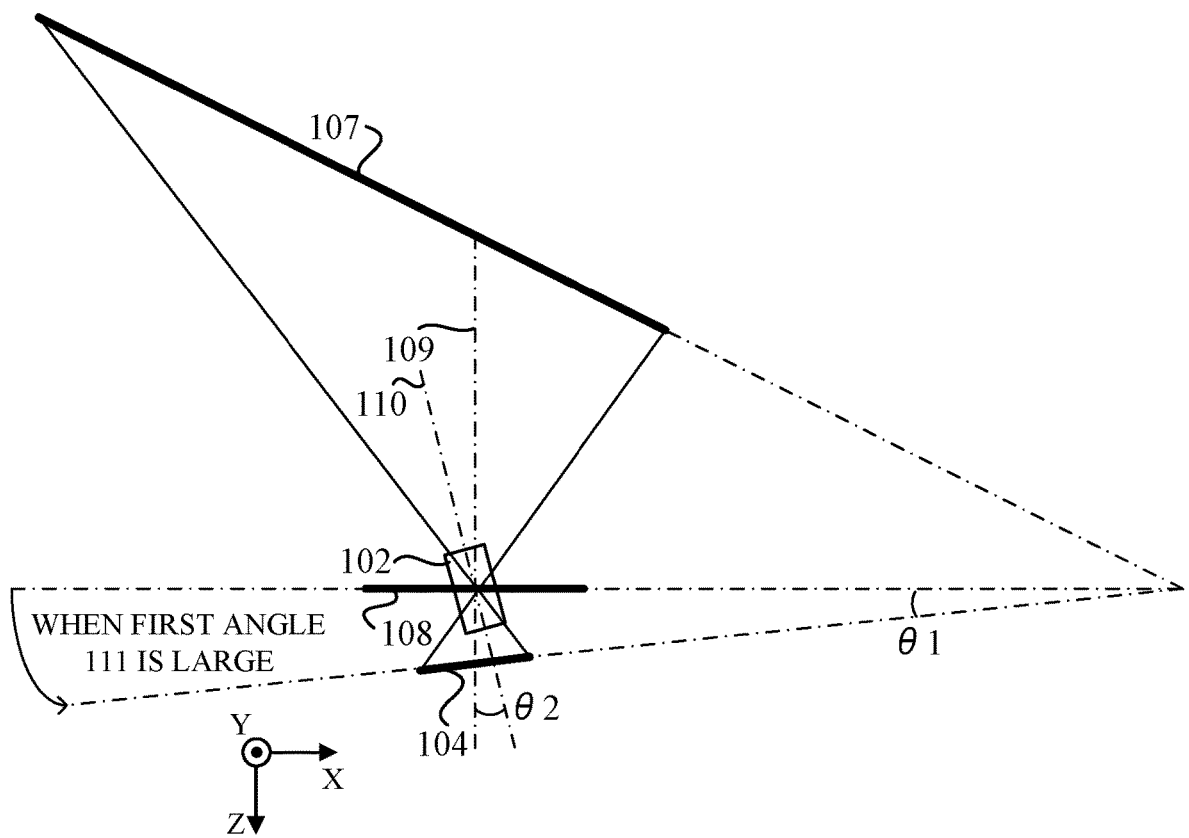

The tilt imaging needs to control the first angle 111 in accordance with the angle between the object plane (focus plane 107) and the principal plane 108 of the imaging optical system 101. FIGS. 7A and 7B are explanatory diagrams of the object plane (focus plane 107). FIGS. 7A and 7B illustrate the relationship among the focus plane 107, the principal plane 108, and the light incident surface (imaging plane) of the image sensor 104 for the small absolute value of the first angle 111 and for the large absolute value of the first angle 111, respectively.

As illustrated in FIGS. 7A and 7B, as the absolute value of the first angle 111 is larger, the distance between the illumination element 102 and the focal plane 107 is largely different within the angle of view of the imaging apparatus 100. When the absolute value of the first angle 111 is small, the uneven illuminance within the angle of view does not become a big issue. When the absolute value of the first angle 111 is small (when the first angle 111 is smaller than a predetermined angle), the optical axis 110 of the illumination element 102 may not be tilted as illustrated in FIG. 7A. For example, if the absolute value of the first angle 111 is less than one degree, then the absolute value of the second angle 112 may be set to zero. In other words, when the first angle 111 is one degree or more, the orientation of the illumination element 102 may be changed so that the optical axis 110 of the illumination element 102 is different from the optical axis 109 of the imaging optical system 101 as in this embodiment.

This embodiment may continuously change the second angle 112 in accordance with the first angle 111. More specifically, the absolute value of the second angle 112 is made larger as the absolute value of the first angle 111 is larger. This can effectively reduce the uneven illuminance.

Second Embodiment

Figure 8:
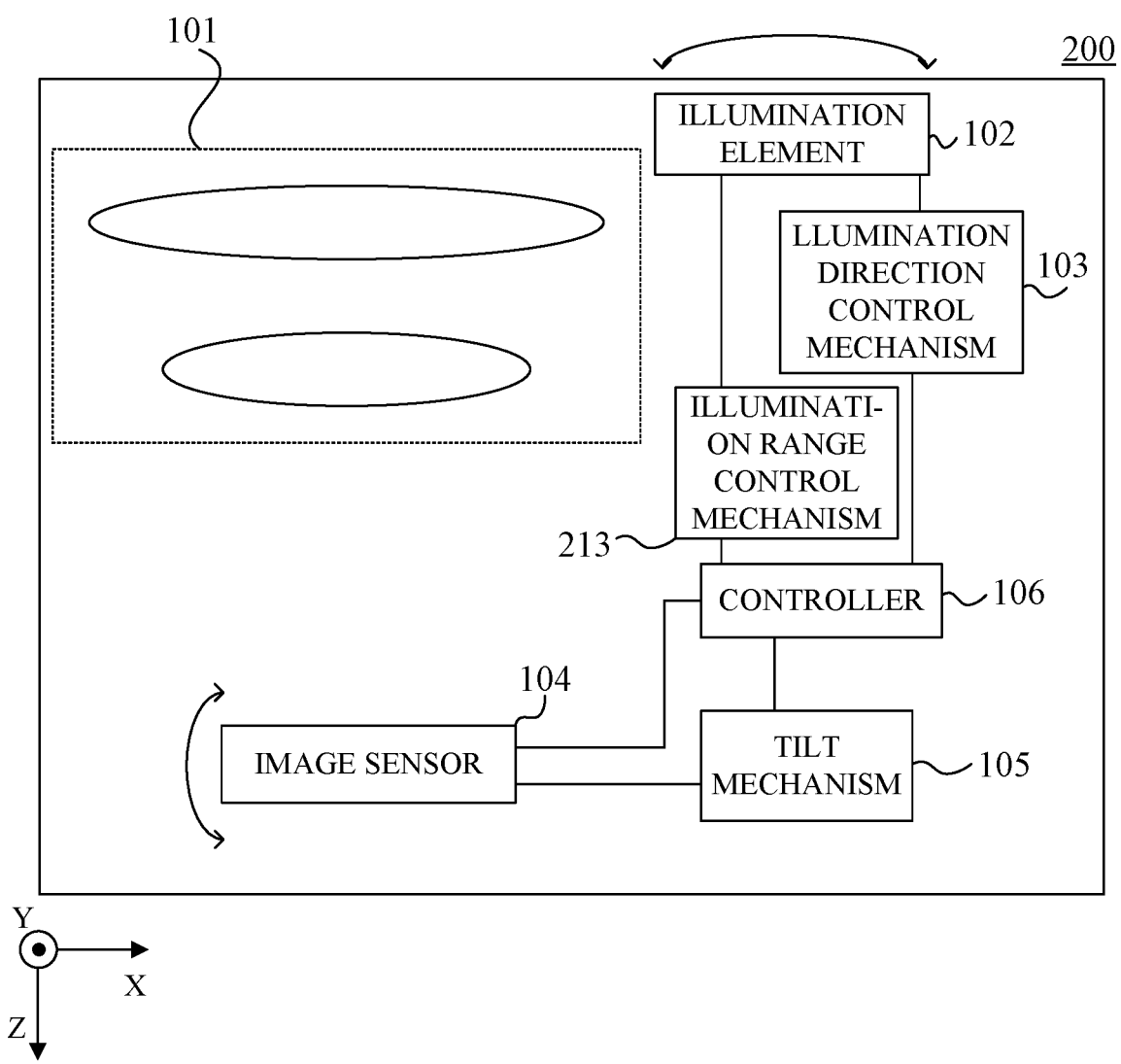
FIG. 8 is a block diagram of an imaging apparatus according to a second embodiment.

Referring now to FIG. 8, a description will be given of an imaging apparatus according to a second embodiment of the present invention. FIG. 8 is a block diagram of an imaging apparatus 200 according to this embodiment. The image sensor 200 according to this embodiment is different from the imaging apparatus 100 of the first embodiment described with reference to FIG. 1 in that it includes an illumination range control mechanism 213 that changes the illumination range (irradiation angle range) of the illumination element 102. The illumination range control mechanism 213 changes the illumination range of the illumination element 102 according to the first angle 111. This configuration can more effectively reduce the uneven illuminance on the focus plane 107 (object plane).

Figure 9A:
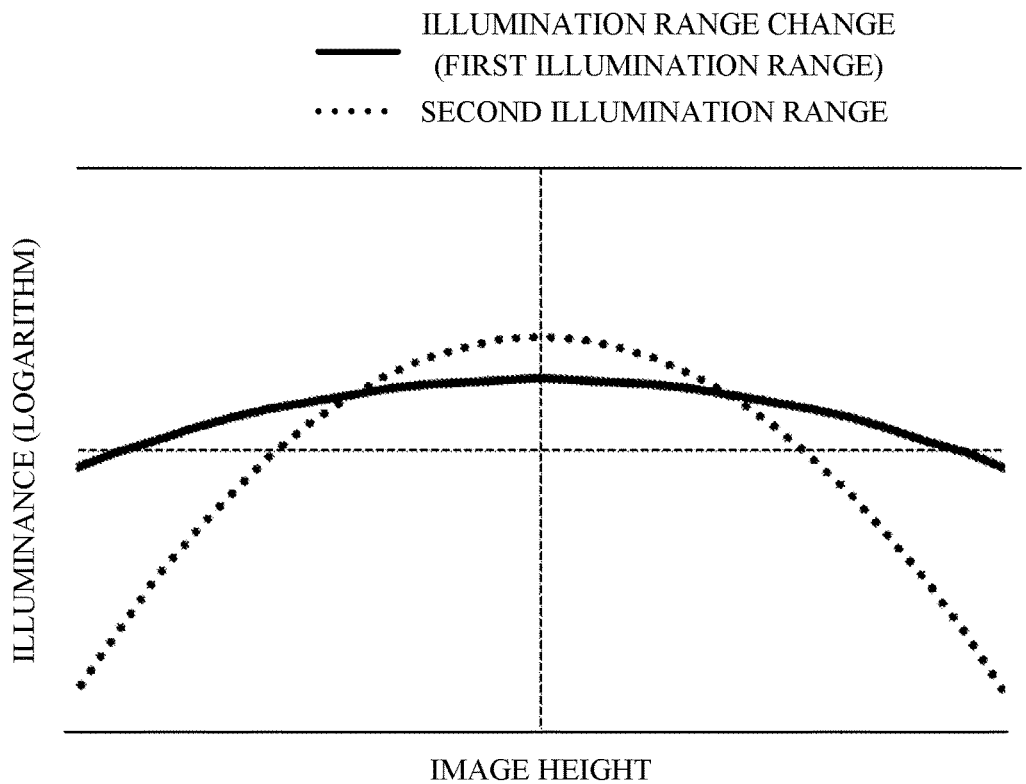
FIGS. 9A and 9B are illumination distribution diagrams of the object plane according to the second embodiment.
Figure 9B:
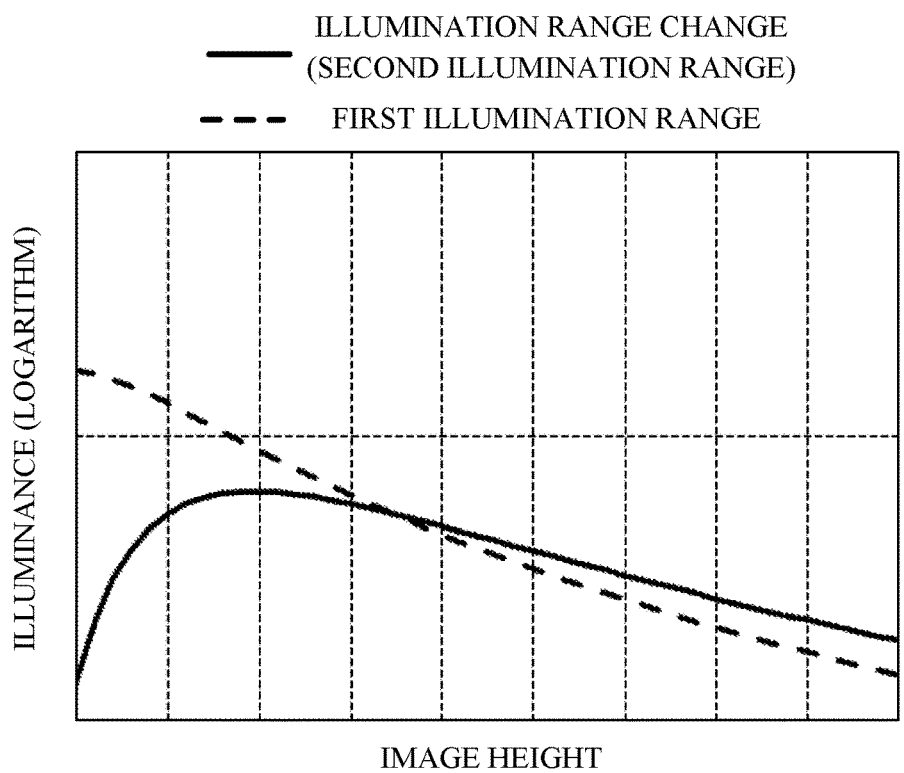

Referring now to FIGS. 9A and 9B, a description will be given of the illuminance distribution on the focus plane 107 (object plane) when the illumination range of the illumination element 102 is changed and when the illumination range is not changed. FIGS. 9A and 9B are illuminance distribution diagrams of the focus plane 107 when the illumination range of the illumination element 102 is changed and when the illumination range is not changed. In FIGS. 9A and 9B, the abscissa axis represents the image height, and the ordinate axis represents the illuminance (logarithm). FIG. 9A illuminates the small absolute value of the first angle 111 because the angle between the object plane and the principal plane 108 of the imaging optical system 101 is made small. On the other hand, FIG. 9B illustrates the large absolute value of the first angle 111 because the angle between the object plane and the principal plane 108 of the imaging optical system 101 is made large.

In FIGS. 9A and 9B, a solid line represents the illumination range of the illumination element 102 is changed according to the first angle 111. In FIGS. 9A and 9B, a broken line and a dotted line show use of the illumination element 102 used to illuminate in a constant illumination range regardless of the first angle 111 as in the imaging apparatus 100 of the first embodiment. A broken line represents the illumination range of the illumination element 102 as a first illumination range, and a dotted line indicates the illumination range of the illumination element 102 as a second illumination range. In FIG. 9A, the solid line and the broken line overlap each other, and in FIG. 9B, the solid line and the dotted line overlap each other.

As illustrated in FIGS. 9A and 9B, where the illumination range is not changed (fixed) according to the first angle 111, an attempt to reduce the uneven illuminance when the absolute value of the first angle 111 is small may increase the uneven illumination when the absolute value of the first angle 111 is large (broken line). On the other hand, an attempt to reduce the uneven illuminance when the absolute value of the first angle 111 is large increase the uneven illuminance when the absolute value of the first angle 111 is small (dotted line).

On the other hand, when the illumination range is changed according to the first angle 111, the uneven illuminance can be reduced regardless of the absolute value of the first angle 111 (solid line). More specifically, as the absolute value of the first angle 111 is larger, the illumination range of the illumination element 102 may be narrowed. In this embodiment, the illumination range means the full width at half maximum of the light intensity distribution emitted from the illumination element 102.

In order to control the illumination range of the illumination element 102, an illumination optical system may be provided on the light emission side of the illumination element 102, and part of the lenses of the illumination optical system may be driven in the optical axis direction of the illumination optical system. Thereby, the focal length of the illumination optical system changes, and the illumination range can be controlled. In order to drive the lens, a motor and a gear may be used to control the current flowing through the motor.

Third Embodiment

Figure 10A:
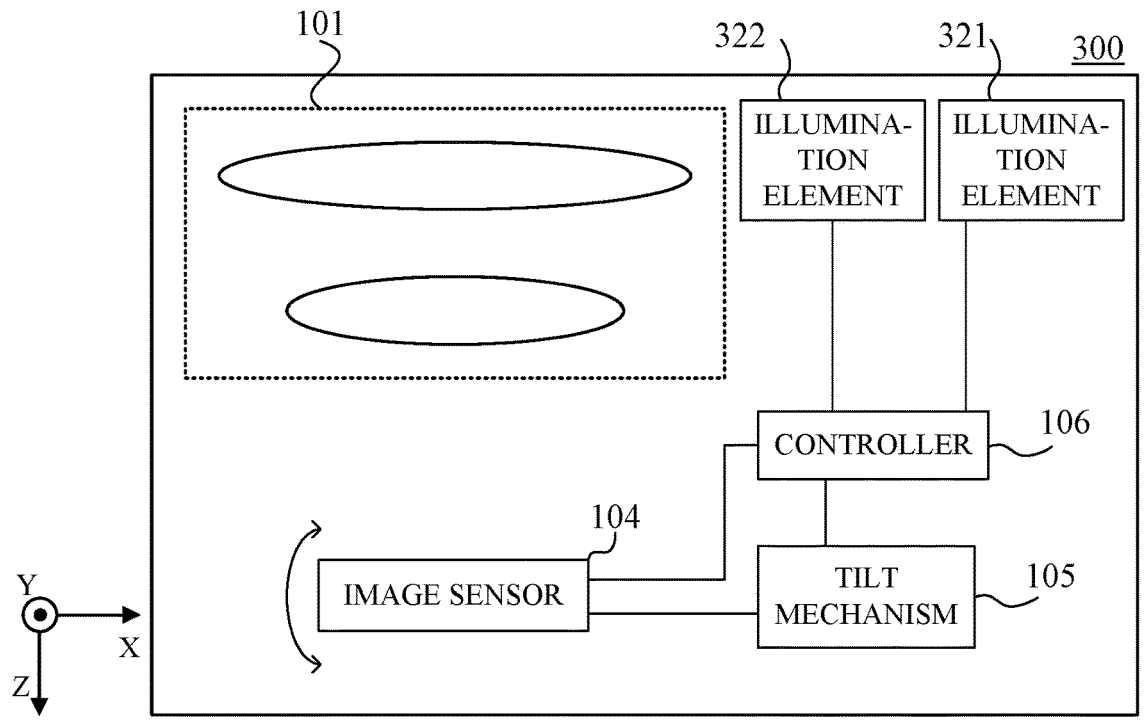
FIGS. 10A and 10B are a block diagram of an imaging apparatus according to a third embodiment and illustrate a relationship between an image sensor and an illumination element in tilt imaging.
Figure 10B:
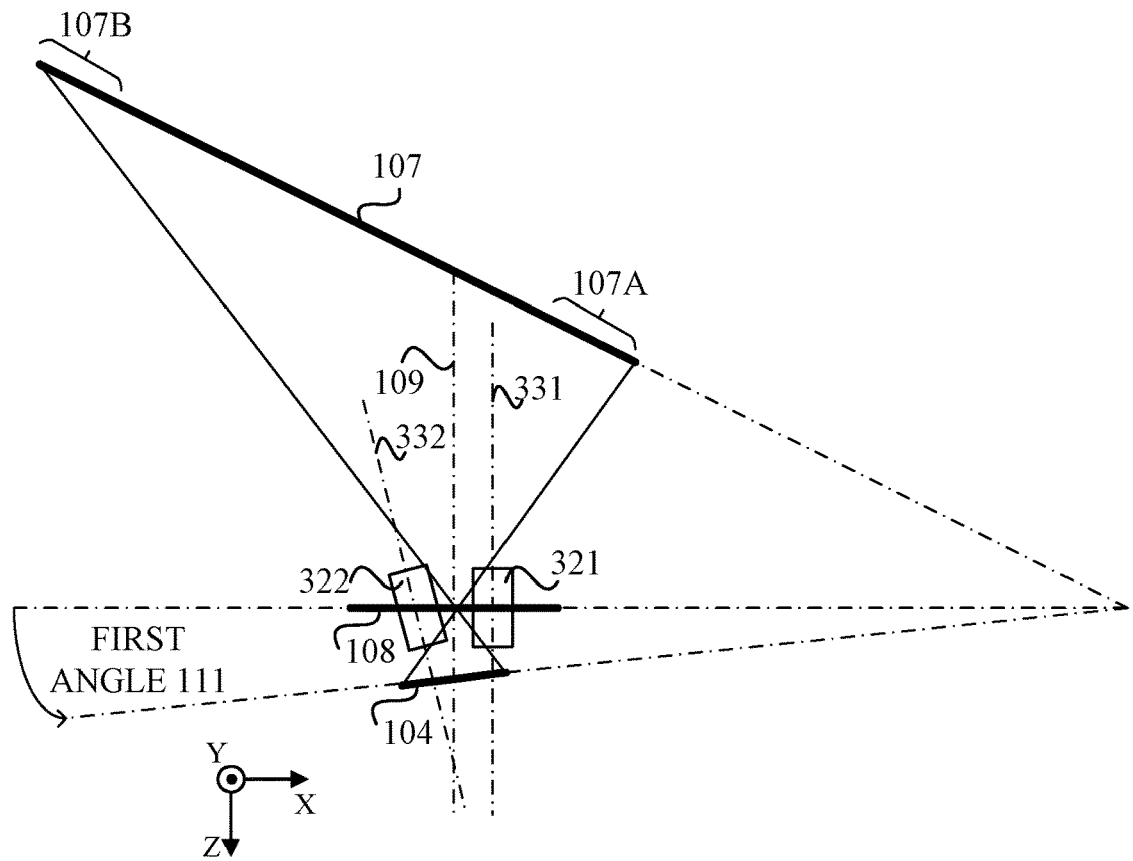

Referring now to FIGS. 10A and 10B, a description will be given of an imaging apparatus according to a third embodiment of the present invention. FIG. 10A is a block diagram of an imaging apparatus 300 according to this embodiment, and FIG. 10B illustrates a relationship between the image sensor 104 and the illumination element 102 in tilt imaging.

Each of the imaging apparatuses 100 and 200 according to the above embodiments includes a single illumination element 102, and rotates the illumination element 102 itself to control the illumination direction, or drives a lens as part of the illumination optical system to control the illumination range. On the other hand, the imaging apparatus 300 according to this embodiment includes a plurality of illumination elements 321 and 322 (first and second illumination elements) both having different illumination directions and illumination ranges. This configuration enables the imaging apparatus 300 to control the effective illumination direction and the illumination range of the plurality of illumination elements as a whole by controlling the current supplied to each of the plurality of illumination elements 321 and 322. This configuration eliminates a rotation mechanism of the illumination element 102 and a lens drive mechanism of the illumination optical system.

As illustrated in FIGS. 10A and 10B, the imaging apparatus 300 includes a plurality of illumination elements 321 and 322 both having different illumination directions. The controller 106 can control the current supplied to each of the plurality of illumination elements 321 and 322. The direction of the optical axis 331 of the illumination element 321 coincides with the direction of the optical axis 109 of the imaging optical system 101. On the other hand, the optical axis 332 of the illumination element 322 inclines counterclockwise to the optical axis 109 of the imaging optical system 101.

Figure 11A:
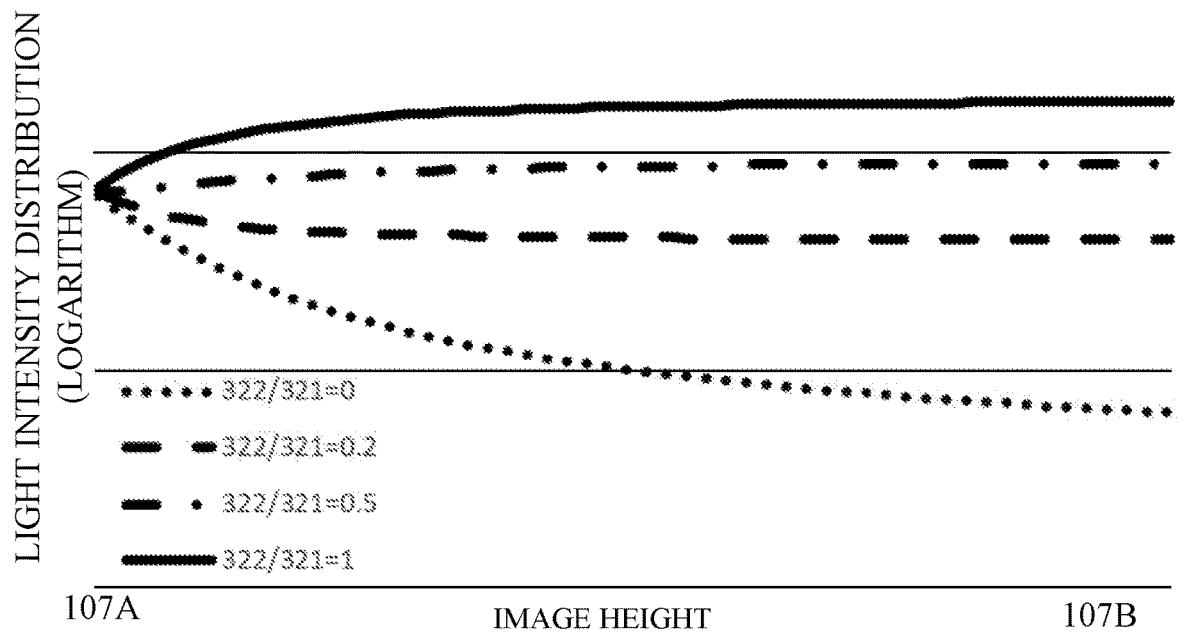
FIGS. 11A and 11B are a light intensity distribution and an illuminance distribution diagram for each ratio of the current flowing in the plurality of illumination elements according to the third embodiment.
Figure 11B:
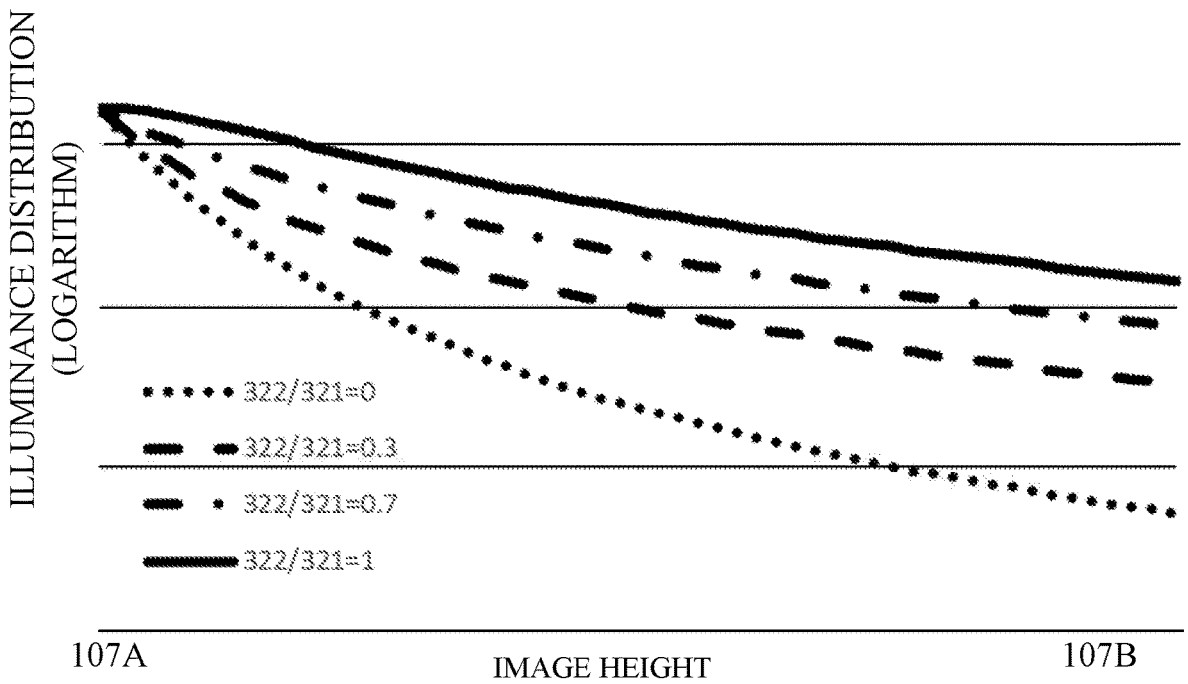

Referring to FIGS. 11A and 11B, a description will be given of a relationship between a ratio of the current flowing through the illumination element 321 and the current flowing through the illumination element 322 of the imaging apparatus 300 and a total distribution of the light intensities irradiated from the illumination elements 321 and 322. FIG. 11A is a distribution diagram (light intensity distribution diagram) of the total light intensities emitted from the illumination elements 321 and 322 for each ratio of the currents flowing through the plurality of illumination elements 321 and 322 of the imaging apparatus 300. In FIG. 11A, the abscissa axis represents the image height, and the ordinate axis represents the light intensity distribution (logarithm). FIG. 11B is an illuminance distribution diagram of the focus plane 107 (object plane) for each current ratio illustrated in FIG. 11A. In FIG. 11B, the abscissa axis represents the image height, and the ordinate axis represents the illuminance distribution (logarithm).

A dotted line, a broken line, an alternate long and short dash line, and a solid line in FIGS. 11A and 11B represent the ratios of the currents supplied to the illumination elements 321 and 322 are 0:1 (322/321=0), 5:1 (322/321=0.2), 2:1 (322/321=0.5), and 1:1 (322/321=1). In other words, the ratio of the current flowing through the illumination element 322 to the current flowing through the illumination element 321 is increased in order of the dotted line, the broken line, the alternate long and short dash line, and the solid line.

As illustrated in FIG. 11B, when the ratio of the current supplied to the illumination element 322 to the current supplied to the illumination element 321 is made larger, the uneven illuminance on the focus plane 107 is reduced. Thus, controlling the currents flowing through the plurality of illumination elements 321 and 322 having different directions can reduce the uneven illuminance on the focus plane 107. As a result, the captured image quality can be improved.

As illustrated in FIG. 11A, when the ratio of the current flowing through the illumination element 322 to the current flowing through the illumination element 321 is made larger, the center of gravity (direction of the illuminator) of the light intensity distribution of the illumination elements 321 and 322 tilts counterclockwise. Thus, in even the configuration of the imaging apparatus 300 illustrated in FIGS. 9A and 9B, the code of the first angle 111 (rotation direction of the light incident surface of the image sensor 104) and the code of the second angle 112 (the rotation direction 110 of the optical axis 110 of the illumination element 102) coincide with each other.

Figure 12:
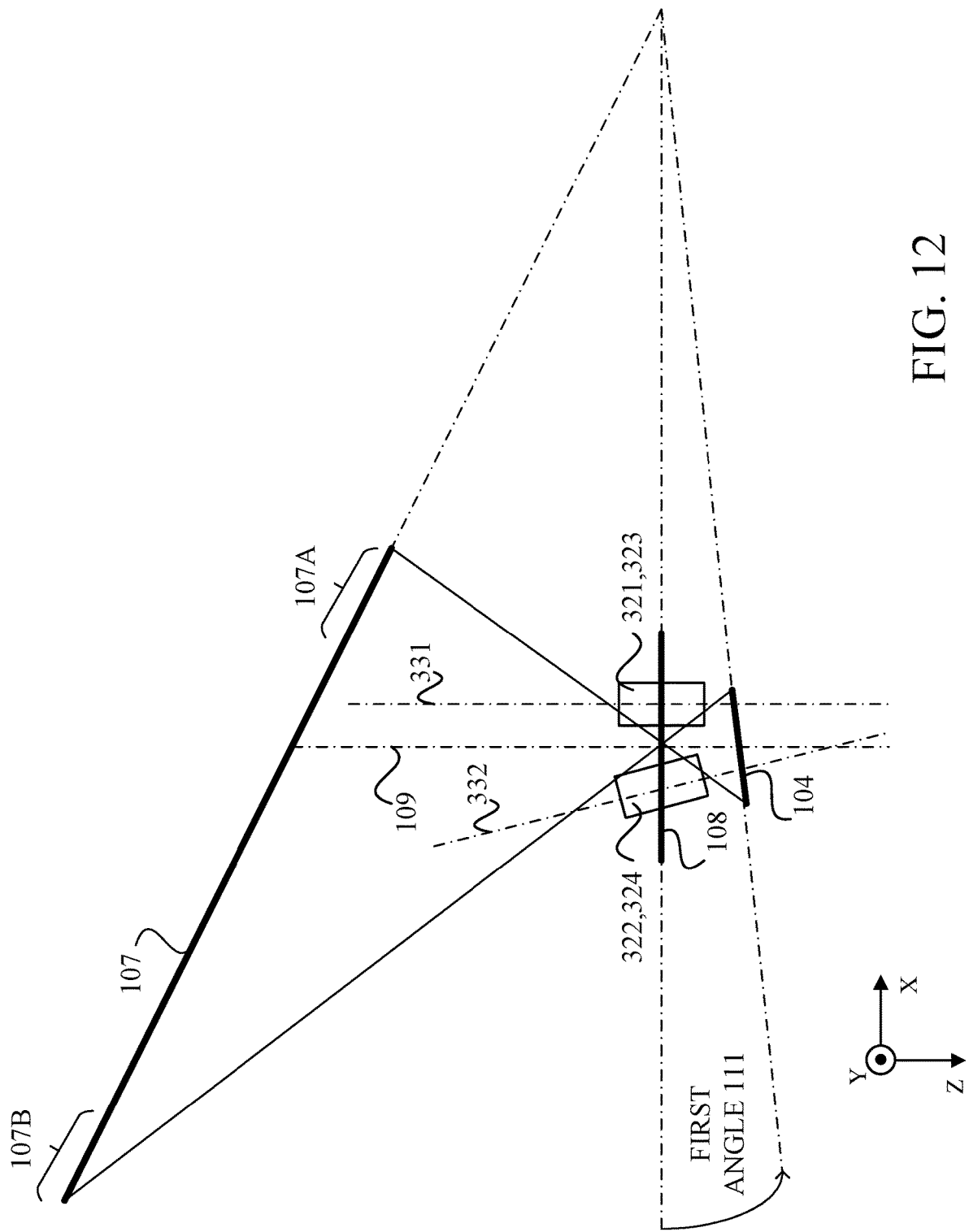
FIG. 12 is a variation of the imaging apparatus according to the third embodiment.

Referring now to FIG. 12, a description will be given of a variation of this embodiment. FIG. 12 is an explanatory diagram of an imaging apparatus including a plurality of illumination elements 323 and 324 having different illumination ranges in addition to the illumination elements 321 and 322 having different orientations. The orientations of the illumination elements 323 and 321 coincide with each other and the orientations of the illumination elements 324 and 322 coincide with each other. In addition, the illumination ranges of the illumination elements 323 and 324 are narrower than the illumination ranges of the illumination elements 321 and 322.

The configuration illustrated in FIG. 12 can control the effective illumination range of the illumination element in addition to the effective orientation of the illumination element. More specifically, when the tilt imaging is not performed, the current flowing through the illumination element 321 is increased to widen the illumination range while the absolute value of the second angle 112 is reduced. On the other hand, when the absolute value of the first angle 111 is large, the current flowing through the illumination element 324 is increased to narrow the illumination range while the absolute value of the second angle 112 is maintained large. This configuration can reduce the uneven illuminance on the focus plane 107 regardless of the first angle 111.

As described above, this embodiment may narrow the illumination range of the illumination element, as the absolute value of the second angle 112 is larger. Thus, as the angle between the optical axis of the illumination element and the optical axis 109 of the imaging optical system 101 is larger, the number of required illumination elements decreases by arranging the plurality of illumination elements whose illumination range is narrow. More specifically, in FIG. 12, the illumination elements 322 and 323 may be removed, and only the illumination elements 321 and 324 may be left.

Fourth Embodiment

Figure 13:
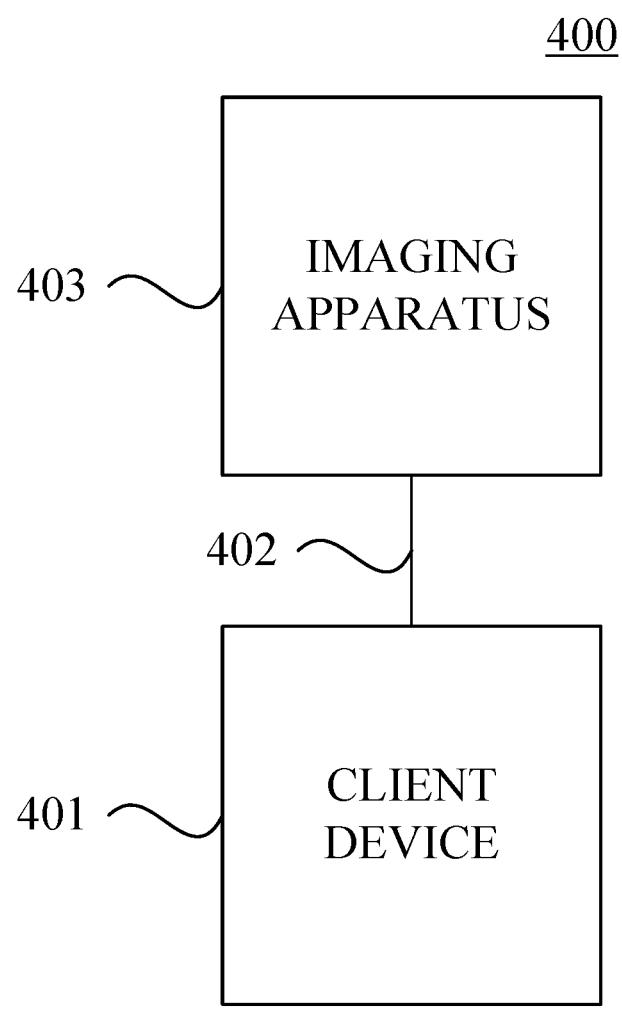
FIG. 13 is a block diagram of a monitoring system according to a fourth embodiment.

Referring now to FIG. 13, a description will be given of a monitoring system according to a fourth embodiment of the present invention. FIG. 13 is a block diagram of a monitoring system 400 according to this embodiment. The monitoring system 400 includes a client device 401 and an imaging apparatus 403. The imaging apparatus 403 corresponds to any one of the imaging apparatuses 100 to 300 according to the first to third embodiments described above.

The client device 401 and the imaging apparatus 403 are connected in a mutually communicable state via a network 402. The client device 401 transmits a variety of commands to the imaging apparatus 403 so as to control the imaging apparatus 403. The imaging apparatus 403 receives a command from the client device 401, and transmits a response according to the command and captured image data to the client device 401. The user can select, via the client device 401, whether to drive the imaging apparatus 403 in a desired mode such as a depth of field priority mode. The client device 401 is an external apparatus such as a PC. The network 402 includes a wired LAN or a wireless LAN. This embodiment may supply the power to the imaging apparatus 403 via the network 402.

Hence, in each embodiment, the imaging apparatus includes the angle controller (tilt mechanism 105) and the illumination controller (illumination direction control mechanism 103). The angle controller changes an angle (tilt angle) formed between the principal plane 108 of the imaging optical system (imaging optical system 101) and the imaging plane (light incident surface) of the image sensor 104. The illumination controller changes the optical axis direction (direction of the optical axis 110) of the illuminator based on the angle changed by the angle controller.

The illumination controller changes the optical axis direction (direction of the optical axis 110) of the illuminator so that it is different from the optical axis direction (direction of the optical axis 109) of the imaging optical system. The illumination controller changes the optical axis direction of the illuminator so that it is closer to the normal direction of the imaging plane of the image sensor. The illumination controller changes the light axis direction of the illuminator so that the illumination intensity for the second area (area 107B) is higher than the illumination intensity for the first area (area 107A) on the focal plane 107 determined based on the angle changed by the angle controller. Herein, the first area is an area in which the distance from the illuminator is a first distance, and the second area is an area in which the distance from the illuminator is a second distance longer than the first distance. The angle controller may change the angle by rotating the imaging plane of the image sensor relative to the principal plane of the imaging optical system.

The illumination controller may change the optical axis direction of the illuminator so that a code of the first angle 111 formed between the principal plane of the imaging optical system and the imaging plane of the image sensor and a code of the second angle 112 formed between the optical axis of the imaging optical system and the optical axis of the illuminator coincide with each other. The absolute value of the second angle may be half or more of the angle of view of the image sensor. The absolute value of the second angle may be equal to or less than the angle of view of the imaging apparatus. The absolute value of the first angle may be one degree or more.

When the absolute value of the first angle may be a first value, the illumination controller sets the absolute value of the second angle to a third value, and when the absolute value of the first angle is a second value larger than the first value, the illumination controller sets the absolute value of the second angle to a fourth value larger than the third value. In other words, the illumination controller makes larger the absolute value of the second angle as the absolute value of the first angle is larger.

The imaging apparatus may include an illumination range controller (illumination range control mechanism 213) that changes the illumination range of the illuminator. When the absolute value of the first angle is a first value, the illumination range controller sets the illumination range to the first illumination range, and when the absolute value of the first angle is a second value larger than the first value, the illumination range controller sets the illumination range to a second illumination range narrower than the first illumination range. In other words, the illumination range controller makes narrower the illumination range as the absolute value of the first angle is larger. The illuminator may include a first illumination element (illumination element 321) and a second illumination element (illumination element 322) both having different illumination ranges. The illumination controller controls the illumination range (effective illumination range) of the illuminator based on the ratio between the current flowing through the first illumination element and the current flowing through the second illumination element. The angle formed between the optical axis of the first illumination element and the optical axis of the imaging optical system is larger than the angle formed between the optical axis of the second illumination element and the optical axis of the imaging optical system. The illumination range of the first illumination element is narrower than the illumination range of the second illumination element. In other words, the illumination range of the illumination element is made narrower as the angle is larger between the optical axis of the illumination element and the optical axis of the imaging optical system.

The illumination controller changes the optical axis direction of the illuminator by controlling the orientation of the illuminator. The angle formed between the optical axis of the first illumination element and the optical axis of the imaging optical system may be different from the angle formed between the optical axis of the second illumination element and the optical axis of the imaging optical system. The illumination controller changes the optical axis direction (effective optical axis direction) of the illuminator by controlling the ratio between the current flowing through the first illumination element and the current flowing through the second illumination element.

Each embodiment can provide an imaging apparatus and a monitoring system, each of which can improve the captured image quality by reducing the uneven luminance distribution of the object in the tilt imaging using the illuminator.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-142871, filed on Jul. 30, 2018, which is hereby incorporated by reference herein in its entirety.

What is claimed is:

1. An imaging apparatus comprising:
an image sensor;
an angle controlling unit configured to change an angle between a plane orthogonal to an optical axis of an imaging optical system and an imaging plane of the image sensor;
an illumination unit; and
an illumination controlling unit configured to change an optical axis direction of the illumination unit based on the angle so as to reduce an unevenness of illuminance on a focus plane focused by changing the angle.

2. The imaging apparatus according to claim 1, wherein the illumination controlling unit changes the optical axis direction of the illumination unit so that the optical axis direction of the illumination unit is different from an optical axis direction of the imaging optical system.

3. The imaging apparatus according to claim 1, wherein the illumination controlling unit changes the optical axis direction of the illumination unit so that the optical axis direction of the illumination unit is closer to a normal direction of the imaging plane of the image sensor.

4. The imaging apparatus according to claim 1, wherein the illumination controlling unit changes the optical axis direction of the illumination unit so that an illumination intensity for a first area distant from the illumination unit by a first distance is lower than an illumination intensity for a second area distant from the illumination unit by a second distance longer than the first distance on a focus plane determined based on the angle.

5. The imaging apparatus according to claim 1, wherein the angle controlling unit changes the angle by rotating the imaging plane of the image sensor relative to the plane orthogonal to the optical axis.

6. The imaging apparatus according to claim 1, wherein the illumination controlling unit changes the optical axis direction of the illumination unit so that a code of a first angle formed between the plane orthogonal to the optical axis and the imaging plane of the image sensor is the same as a code of a second angle formed between an optical axis of the imaging optical system and an optical axis of the illumination unit.

7. The imaging apparatus according to claim 6, wherein an absolute value of the second angle is half or more of an angle of view of the imaging apparatus.

8. The imaging apparatus according to claim 6, wherein an absolute value of the second angle is equal to or less than an angle of view of the imaging apparatus.

9. The imaging apparatus according to claim 6, wherein an absolute value of the first angle is one degree or more.

10. The imaging apparatus according to claim 6, wherein the illumination controlling unit sets, if an absolute value of the first angle is a first value, an absolute value of the second angle to a third value, and sets, if an absolute value of the first angle is a second value larger than the first value, an absolute value of the second angle to a fourth value larger than the third value.

11. The imaging apparatus according to claim 6, further comprising an illumination range controlling unit configured to change an illumination range of the illumination unit,
wherein the illumination range controlling unit sets the illumination range to a first illumination range when an absolute value of the first angle is a first value, and sets the illumination range to a second illumination range narrower than the first illumination range when the absolute value of the first angle is a second value larger than the first value.

12. The imaging apparatus according to claim 11, wherein the illumination unit includes a first illumination element and a second illumination element having different illumination ranges, and
wherein the illumination controlling unit controls the illumination range of the illumination unit based on a ratio between current flowing through the first illumination element and current flowing through the second illumination element.

13. The imaging apparatus according to claim 12, wherein an angle between an optical axis of the first illumination element and an optical axis of the imaging optical system is larger than an angle between the optical axis of the second illumination element and the optical axis of the imaging optical system, and
wherein the illumination range of the first illumination element is narrower than the illumination range of the second illumination element.

14. The imaging apparatus according to claim 1, wherein the illumination controlling unit changes the optical axis direction of the illumination unit by controlling an orientation of the illumination unit.

15. The imaging apparatus according to claim 1, wherein the illumination unit includes a first illumination element and a second illumination element,
wherein an angle between an optical axis of the first illumination element and an optical axis of the imaging optical system is different from an angle between an optical axis of the second illumination element and the optical axis of the imaging optical system, and
wherein the illumination controlling unit changes the optical axis direction of the illumination unit by controlling a ratio between current flowing through the first illumination element and current flowing through the second illumination element.

16. A control method of an imaging apparatus, the method comprising:
changing an angle between a plane orthogonal to an optical axis of an imaging optical system and an imaging plane of an image sensor; and
changing an optical axis direction of an illumination unit based on the angle so as to reduce an unevenness of illuminance on a focus plane focused by changing the angle.

17. A non-transitory computer-readable storage medium storing a program for causing a computer to execute a control method of an imaging apparatus, the method comprising:
    changing an angle between a plane orthogonal to an optical axis of an imaging optical system and an imaging plane of an image sensor; and
    changing an optical axis direction of an illumination unit based on the angle so as to reduce an unevenness of illuminance on a focus plane focused by changing the angle.

* * * * *